United States Patent
Saitou et al.

(10) Patent No.: US 6,837,909 B2
(45) Date of Patent: Jan. 4, 2005

(54) FUEL FOR USE IN A FUEL CELL SYSTEM

(75) Inventors: Kenichirou Saitou, Kanagawa (JP); Iwao Anzai, Kanagawa (JP); Osamu Sadakane, Kanagawa (JP); Michiro Matsubara, Kanagawa (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 10/240,743

(22) PCT Filed: Apr. 10, 2001

(86) PCT No.: PCT/JP01/03088

§ 371 (c)(1),
(2), (4) Date: Oct. 10, 2002

(87) PCT Pub. No.: WO01/77259

PCT Pub. Date: Oct. 18, 2001

(65) Prior Publication Data

US 2003/0127355 A1 Jul. 10, 2003

(30) Foreign Application Priority Data

Apr. 10, 2000 (JP) ........................ 2000-107681

(51) Int. Cl.⁷ .............................. C10L 1/04
(52) U.S. Cl. ............. 44/300; 585/14; 123/1 A
(58) Field of Search ............. 44/300; 585/14; 123/1 A

(56) References Cited

U.S. PATENT DOCUMENTS

| | | | |
|---|---|---|---|
| 4,330,302 A | * 5/1982 | Taylor | 44/322 |
| 4,410,333 A | 10/1983 | Fujimoto | |
| 4,946,750 A | 8/1990 | Nomden et al. | |
| 5,130,115 A | 7/1992 | Fujisou et al. | |
| 5,284,717 A | 2/1994 | Yamase et al. | |
| 5,358,696 A | 10/1994 | Jahnke | |
| 5,653,866 A | * 8/1997 | Jessup et al. | 208/46 |
| 5,897,970 A | 4/1999 | Isomura et al. | |
| 6,039,772 A | * 3/2000 | Orr | 44/359 |
| 6,514,298 B2 | * 2/2003 | Haji et al. | 44/420 |
| 2002/0120171 A1 | * 8/2002 | Avery et al. | 585/14 |

FOREIGN PATENT DOCUMENTS

| | | | |
|---|---|---|---|
| EP | 0 435 736 | | 7/1991 |
| GB | 1176690 | * | 1/1970 |
| JP | 50-126005 | | 10/1975 |
| JP | 63-040702 | | 2/1988 |
| JP | 5-70780 | | 3/1993 |
| JP | 05-070780 | * | 3/1993 |
| JP | 05-140568 | | 6/1993 |
| JP | 05-260612 | | 10/1993 |
| JP | 6-80972 | | 3/1994 |
| JP | 06-080972 | * | 3/1994 |
| JP | 07-188678 | | 7/1995 |
| JP | 08-311463 | | 11/1996 |
| JP | 9-71788 | | 3/1997 |
| JP | 09-059648 | | 3/1997 |
| JP | 09-071788 | * | 3/1997 |

(List continued on next page.)

*Primary Examiner*—Cephia D. Toomer
(74) *Attorney, Agent, or Firm*—Oblon, Spviak, McClelland, Maier & Neustadt, P.C.

(57) ABSTRACT

A fuel for a fuel cell system comprising hydrocarbon compounds, wherein a content of saturates is 30 vol. % or more, a content of olefins is 35 vol. % or less and a content of aromatics is 50 vol. % or less. The fuel for a fuel cell system has a high power generation quantity per weight, a high power generation quantity per $CO_2$ emission, a low fuel consumption, a small quantity of evaporative gas (evapo-emission), small deterioration of a fuel cell system comprising such as a reforming catalyst, a water gas shift reaction catalyst, a carbon monoxide removal catalyst, fuel cell stacks and the like to maintain the initial performances for a long duration, good handling properties in terms of storage stability and inflammability, and a low preheating energy.

1 Claim, 2 Drawing Sheets

FOREIGN PATENT DOCUMENTS

| | | |
|---|---|---|
| JP | 09-075721 | 3/1997 |
| JP | 10-121069 | 5/1998 |
| JP | 10-236802 | 9/1998 |
| JP | 10-237473 | 9/1998 |
| JP | 10-255830 | 9/1998 |
| JP | 10-330101 | 12/1998 |
| JP | 11-050070 | 2/1999 |
| JP | 11-139803 | 5/1999 |
| JP | 11-236580 | 8/1999 |
| JP | 11-263712 | 9/1999 |
| JP | 11-311136 | 11/1999 |
| JP | 2000-012061 | 1/2000 |
| JP | 2000-090952 | 3/2000 |
| WO | WO 01/77259 | 10/2001 |

* cited by examiner

US 6,837,909 B2

FUEL FOR USE IN A FUEL CELL SYSTEM

TECHNICAL FIELD

The present invention relates to a fuel to be used for a fuel cell system.

BACKGROUND ART

Recently, with increasing awareness of the critical situation of future global environments, it has been highly expected to develop an energy supply system harmless to the global environments. Especially urgently required are to reduce $CO_2$ to prevent global warming and reduce harmful emissions such as THC (unreacted hydrocarbons in an exhaust gas), $NO_x$, PM (particulate matter in an exhaust gas: soot, unburned high boiling point and high molecular weight fuel and lubricating oil). Practical examples of such a system are an automotive power system to replace a conventional Otto/Diesel engine and a power generation system to replace thermal power generation.

Hence, a fuel cell, which has high energy efficiency and emits only $H_2O$ and $CO_2$, has been regarded as a most expectative system to respond to social requests. In order to achieve such a system, it is necessary to develop not only the hardware but also the optimum fuel.

Conventionally, as a fuel for a fuel cell system, hydrogen, methanol, and hydrocarbons have been candidates.

As a fuel for a fuel cell system, hydrogen is advantageous in a point that it does not require a reformer, however, because of a gas phase at a normal temperature, it has difficulties in storage and loading in a vehicle and special facilities are required for its supply. Further, the risk of inflammation is high and therefore, it has to be handled carefully.

On the other hand, methanol is advantageous in a point that it is relatively easy to reform, however power generation quantity per weight is low and owing to its toxicity, handling has to be careful. Further, it has a corrosive property, special facilities are required for its storage and supply.

Like this, a fuel to sufficiently utilize the performances of a fuel cell system has not yet been developed. Especially, as a fuel for a fuel cell system, the following are required: power generation quantity per weight is high; power generation quantity per $CO_2$ emission is high; a fuel consumption is low in a fuel cell system as a whole; an evaporative gas (evapo-emission) is a little; deterioration of a fuel cell system comprising such as a reforming catalyst, a water gas shift reaction catalyst, a carbon monoxide conversion catalyst, fuel cell stacks and the like is scarce to keep the initial performances for a long duration; a starting time for the system is short; and storage stability and handling easiness are excellent.

Incidentally, in a fuel cell system, it is required to keep a fuel and a reforming catalyst at a proper temperature, the net power generation quantity of the entire fuel cell system is equivalent to the value calculated by subtracting the energy necessary for keeping the temperature (the energy for keeping balance endothermic and exothermic reaction following the preheating energy) from the actual power generation quantity. Consequently, if the temperature for the reforming is lower, the energy for preheating is low and that is therefore advantageous and further the system starting time is advantageously shortened. In addition, it is also necessary that the energy for preheating per fuel weight is low. If the preheating is insufficient, unreacted hydrocarbon (THC) in an exhaust gas increases and it results in not only decrease of the power generation quantity per weight but also possibility of becoming causes of air pollution. To say conversely, when some kind of fuels are reformed by the same reformer and the same temperature, it is more advantageous that THC in an exhaust gas is lower and the conversion efficiency to hydrogen is higher.

The present invention, taking such situation into consideration, aims to provide a fuel suitable for a fuel cell system satisfying the above-described requirements in good balance.

DISCLOSURE OF THE INVENTION

Inventors of the present invention have extensively investigated to solve the above-described problems and found that a fuel comprising specific hydrocarbon compounds in the specific amount is suitable for a fuel cell system.

That is, the fuel for a fuel cell system according to the present invention comprises:
(1) hydrocarbon compounds and the fuel comprises 30 vol. % or more of saturates, 35 vol. % or less of olefins and 50 vol. % or less of aromatics.

The fuel comprising hydrocarbon compounds and having the above-described specific properties is preferable to satisfy the following additional requirements:
(2) sulfur content is 50 ppm by mass or less;
(3) ratio of paraffins in saturates is 60 vol. % or more;
(4) ratio of branched paraffins in paraffins is 30 vol. % or more;
(5) Reid vapor pressure (RVP) is 10 kPa or more and less than 100 kPa;

BEST MODE FOR CARRYING OUT THE INVENTION

Figure 1:
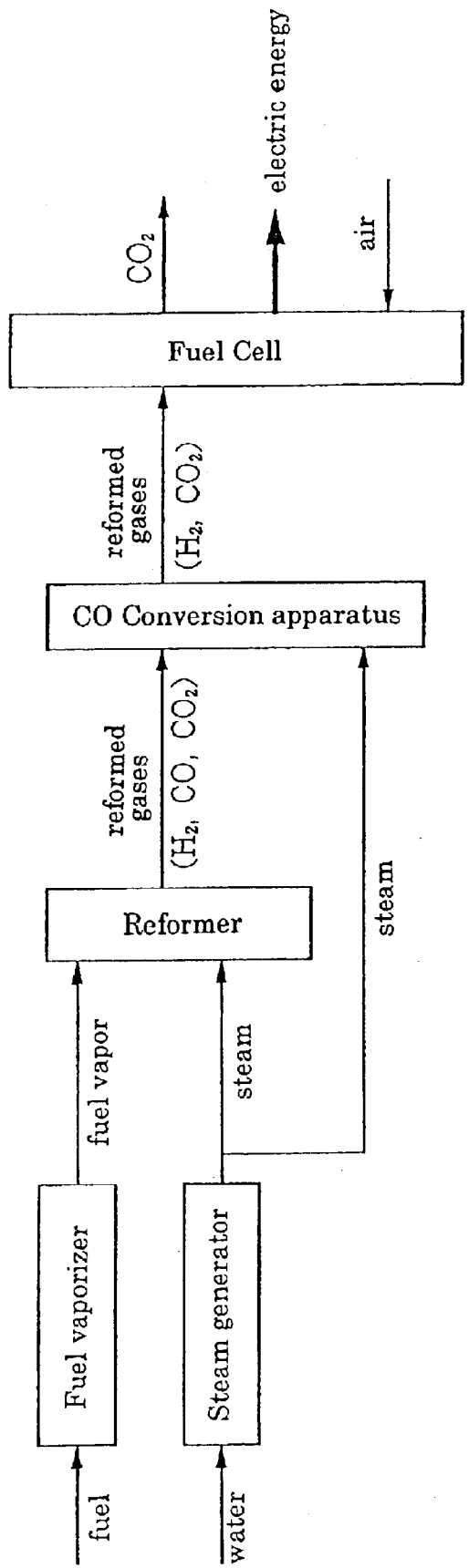
FIG. 1 shows a flow chart of a steam reforming type fuel cell system employed for evaluation of a fuel for a fuel cell system of the invention.

Hereinafter, the contents of the invention will be described further in detail.

In the present invention, the hydrocarbon compounds with specified properties are as follows.

In the invention, the respective contents of saturates, olefins and aromatics are not particularly restricted, however, saturates (V (S)), olefins (V (O)) and aromatics (V (Ar)) are preferably 30 vol. % or more, 35 vol. % or less, and 50 vol. % or less, respectively. Hereinafter, these components will separately be described.

In terms of a high power generation quantity per weight, a high power generation quantity per $CO_2$ emission, a low fuel consumption of a fuel cell system as a whole, small THC in an exhaust gas, and a short starting time of the system, V (S) is preferably 30 vol. % or more, more preferably 40 vol. % or more, further more preferably 50 vol. % or more, much further more preferably 60 vol. % or more, much further more preferably 70 vol. % or more, much further more preferably 80 vol. % or more, much further more preferably 90 vol. % or more, and most preferably 95 vol. % or more.

In terms of a high power generation quantity per weight, a high power generation quantity per $CO_2$ emission, small deterioration of a reforming catalyst to maintain the initial performances for a long duration, and a good storage stability, V (O) is preferably 35 vol. % or less, more preferably 25 vol. % or less, further more preferably 20 vol. % or less, much further more preferably 15 vol. % or less, and most preferably 10 vol. % or less.

In terms of a high power generation quantity per weight, a high power generation quantity per $CO_2$ emission, a low fuel consumption of a fuel cell system as a whole, small THC in an exhaust gas, a short starting time of the system, and small deterioration of a reforming catalyst to maintain the initial performances for a long duration, V (Ar) is preferably 50 vol. % or less, more preferably 45 vol. % or less, further more preferably 40 vol. % or less, much further more preferably 35 vol. % or less, much further more preferably 30 vol. % or less, much further more preferably 20 vol. % or less, much further more preferably 10 vol. % or less, and most preferably 5 vol. % or less.

The values of the above-described V (S), V (O), and V (Ar) are all measured value according to the fluorescent indicator adsorption method of JIS K 2536, "Liquid petroleum products-Testing method of components".

Further, the content of sulfur in a fuel of the invention is not particularly restricted, however, because deterioration of a fuel cell system comprising a reforming catalyst, a water gas shift reaction catalyst, a carbon monoxide removal catalyst, fuel cell stacks, and the like can be suppressed to low and the initial performances can be maintained for a long duration, the content is preferably 50 ppm by mass or less, more preferably 30 ppm by mass or less, further more preferably 10 ppm by mass or less, much further more preferably 1 ppm by mass or less, and most preferably 0.1 ppm by mass or less.

Further, it is most preferable to satisfy the above-described preferable ranges of sulfur and the above-described preferable ranges for the aromatics since deterioration of a reforming catalyst can be suppressed to low and the initial performances can be maintained for a long duration.

Here, sulfur means sulfur measured by JIS K 2541, "Crude Oil and Petroleum Products-Determination of sulfur content", in case of 1 ppm by mass or more and means sulfur measured by ASTM D4045-96, "Standard Test Method for Sulfur in Petroleum Products by Hydrogenolysis and Rateometric Colorimetry" in the case of less than 1 ppm by mass.

Further, in the invention, the ratio of paraffins in saturates of a fuel is not particularly restricted, however, in terms of a high $H_2$ generation quantity, a high power generation quantity per weight and a high power generation quantity per $CO_2$ emission, the ratio of paraffins in saturates is preferably 60 vol. % or more, more preferably 65 vol. % or more, further more preferably 70 vol. % or more, much further more preferably 80 vol. % or more, much further more preferably 85 vol. % or more, much further more preferably 90 vol. % or more, and most preferably 95 vol. % or more.

The above-described saturates and paraffins are values quantitatively measured by the following gas chromatography. That is, the values are measured in conditions: employing capillary columns of methyl silicon for columns; using helium or nitrogen as a carrier gas; a hydrogen ionization detector (FID) as a detector; the column length of 25 to 50 m; the carrier gas flow rate of 0.5 to 1.5 ml/min, the split ratio of (1:50) to (1:250); the injection inlet temperature of 150 to 250° C.; the initial column temperature of −10 to 10° C.; the final column temperature of 150 to 250° C., and the detector temperature of 150 to 250° C.

Further, the ratio of branched paraffins in the above-described paraffins is not particularly restricted, however, the ratio of branched paraffins in paraffins is preferably 30 vol. % or more, more preferably 50 vol. % or more, and most preferably 70 vol. % or more in terms of a high power generation quantity per weight, a high power generation quantity per $CO_2$ emission, a low fuel consumption of a fuel cell system as a whole, small THC in an exhaust gas, and a short starting time of the system.

The amounts of the above-described paraffins and branched paraffins are values quantitatively measured by the above-described gas chromatography.

Further, in the invention, the Reid vapor pressure (RVP) of a fuel is not particularly restricted, however, it is preferably 10 kPa or more in terms of the power generation quantity per weight and preferably less than 100 kPa in terms of suppression of the amount of an evaporative gas (evapo-emission). It is more preferably 10 kPa or more and less than 80 kPa, further more preferably 10 kPa or more and less than 60 kPa. Here, the Reid vapor pressure (RVP) means the vapor pressure (Reid vapor pressure (RVP)) measured by JIS K 2258, "Testing Method for Vapor Pressure of Crude Oil and Products (Reid Method)".

A method of producing the fuel according to the present invention is not particularly limited. For example, the fuel can be prepared by blending one or more following hydrocarbon base materials; light naphtha obtained by the atmospheric distillation of crude oil, heavy naphtha obtained by the atmospheric distillation of crude oil, desulfurized light naphtha obtained by desulfurization of light naphtha, desulfurized heavy naphtha obtained by desulfurization of heavy naphtha, isomerate obtained by converting light naphtha into isoparaffins by an isomerization process, alkylate obtained by the addition reaction (alkylation) of low molecule weight olefins to hydrocarbons such as isobutane, desulfurized alkylate obtained by desulfurizing alkylate, low sulfur alkylate produced from desulfurized hydrocarbons such as isobutane and desulfurized low molecule weight olefins, reformate obtained by catalytic reforming, raffinate which is residue after extraction of aromatics from distillate of reformate, light distillate of reformate, middle to heavy distillate of reformate, heavy distillate of reformate, cracked gasoline obtained by by catalytic cracking or hydrocracking process, light distillate of cracked gasoline, heavy distillate of cracked gasoline, desulfurized cracked gasoline obtained by desulfurizing cracked gasoline, desulfurized light distillate of cracked gasoline obtained by desulfurizing light distillate of cracked gasoline, desulfurized heavy distillate of cracked gasoline obtained by desulfurizing heavy distillate of cracked gasoline, light distillate of "GTL (Gas to Liquids)" obtained by F-T (Fischer-Tropsch) synthesis after cracking natural gas or the like to carbon monoxide and hydrogen, desulfurized LPG obtained by desulfurizing LPG, and the like. The fuel can also be produced by desulfurizing by hydrotreating or adsorption after mixing one or more types of the above base materials.

Among them, preferable materials as the base materials for the production of the fuel of the invention are light naphtha, desulfurized light naphtha, isomerate, desulfurized alkylates obtained by desulfurizing alkylates, low sulfur alkylates produced from desulfurized hydrocarbons such as isobutane and desulfurized low molecule weight olefins, desulfurized light distillate of cracked gasoline obtained by desulfurizing a light distillate of cracked gasoline, a light distillate of GTL, desulfurized LPG obtained by desulfurizing LPG, and the like.

A fuel for a fuel cell system of the invention may comprise additives such as dyes for identification, oxidation inhibitors for improvement of oxidation stability, metal deactivators, corrosion inhibitors for corrosion prevention, detergents for keeping cleanness of a fuel system, lubricity improvers for improvement of lubricating property and the like.

However, since a reforming catalyst is to be scarcely deteriorated and the initial performances are to be maintained for a long duration, the amount of the dyes is preferably 10 ppm or less and more preferably 5 ppm or less. For the same reasons, the amount of the oxidation inhibitors is preferably 300 ppm or less, more preferably 200 ppm or less, further more preferably 100 ppm or less, and most preferably 10 ppm or less. For the same reasons, the amount of the metal deactivators is preferably 50 ppm or less, more preferably 30 ppm or less, further more preferably 10 ppm or less, and most preferably 5 ppm or less. Further, similarly since a reforming catalyst is to be scarcely deteriorated and the initial performances are to be maintained for a long duration, the amount of the corrosion inhibitors is preferably 50 ppm or less, more preferably 30 ppm or less, further more preferably 10 ppm or less, and most preferably 5 ppm or less. For the same reasons, the amount of the detergents is preferably 300 ppm or less, more preferably 200 ppm or less, and most preferably 100 ppm or less. For the same reasons, the amount of the lubricity improvers is preferably 300 ppm or less, more preferably 200 ppm or less, and most preferably 100 ppm or less.

A fuel of the invention is to be employed as a fuel for a fuel cell system. A fuel cell system mentioned herein comprises a reformer for a fuel, a carbon monoxide conversion apparatus, fuel cells and the like, however, a fuel of the invention may be suitable for any fuel cell system.

The reformer for a fuel is an apparatus for obtaining hydrogen, which is a fuel of fuel cells, by reforming a fuel. Practical examples of the reformer are:

(1) a steam reforming type reformer for obtaining products of mainly hydrogen by treating a heated and vaporized fuel and steam with a catalyst such as copper, nickel, platinum, ruthenium and the like;

(2) a partial oxidation type reformer for obtaining products of mainly hydrogen by treating a heated and vaporized fuel and air with or without a catalyst such as copper, nickel, platinum, ruthenium and the like; and (3) an auto-thermal reforming type reformer for obtaining products of mainly hydrogen by treating a heated and vaporized fuel, steam and air, which carries out the partial oxidation of (2) in the prior stage and carries out the steam type reforming of (1) in the posterior stage while using the generated heat of the partial oxidation reaction with a catalyst such as copper, nickel, platinum, ruthenium and the like.

The carbon monoxide conversion apparatus is an apparatus for removing carbon monoxide which is contained in a gas produced by the above-described reformer and becomes a catalyst poison in a fuel cell and practical examples thereof are:

(1) a water gas shift reactor for obtaining carbon dioxide and hydrogen as products from carbon monoxide and steam by reacting a reformed gas and steam in the presence of a catalyst of such as copper, nickel, platinum, ruthenium and the like; and (2) a preferential oxidation reactor for converting carbon monoxide into carbon dioxide by reacting a reformed gas and compressed air in the presence of a catalyst of such as platinum, ruthenium and the like, and these are used singly or jointly.

As a fuel cell, practical examples are a proton exchange membrane fuel cell (PEFC), a phosphoric acid type fuel cell (PAFC), a molten carbonate type fuel cell (MCFC), a solid oxide type fuel cell (SOFC) and the like.

Further, the above-described fuel cell system can be employed for an electric automobile, a hybrid automobile comprising a conventional engine and electric power, a portable power source, a dispersion type power source, a power source for domestic use, a cogeneration system and the like.

EXAMPLES

The properties of base materials employed for the respective fuels for examples and comparative examples are shown in Tables 1 and 2.

Heat capacity and heat of vaporization were calculated from the contents of respective components quantitatively measured by the above-described gas chromatography and from the numeric values per unit weight of the respective components disclosed in "Technical Data Book-Petroleum Refining", Vol. 1, Chap. 1, General Data, Table 1C1.

Also, the properties of the respective fuels employed for examples and comparative examples are shown in Table 3.

TABLE 1

| | | | desulfurized full-range naphtha*1 | desulfurized full-range naphtha B*2 | desulfurized light naphtha*3 | desulfurized heavy naphtha*4 | middle to heavy distillate of reformate*5 | heavy distillate of reformate*6 | sulfolane raffinate*7 |
|---|---|---|---|---|---|---|---|---|---|
| sulfur | | | 0.3 | 0.3 | 0.1 | 0.2 | 0.4 | 0.3 | 0.4 |
| hydrocarbon ratio | carbon number: $C_4$ | vol. % | 1.6 | 0.2 | 5.4 | 0.0 | 0.0 | 0.0 | 0.7 |
| | carbon number: $C_5$ | vol. % | 12.5 | 9.5 | 42.2 | 0.3 | 0.0 | 0.0 | 4.4 |
| | carbon number: $C_6$ | vol. % | 19.7 | 22.5 | 49.2 | 7.2 | 0.6 | 0.0 | 46.2 |
| | carbon number: $C_7$ | vol. % | 20.9 | 22.3 | 3.1 | 28.1 | 36.2 | 0.0 | 47.6 |
| | carbon number: $C_8$ | vol. % | 24.3 | 24.4 | 0.1 | 33.1 | 47.9 | 0.0 | 1.1 |
| | carbon number: $C_7 + C_8$ | vol. % | 45.2 | 46.7 | 3.2 | 61.2 | 84.1 | 0.0 | 48.7 |
| | carbon number: $C_9$ | vol. % | 18.5 | 18.6 | 0.0 | 26.4 | 13.3 | 68.3 | 0.0 |
| | carbon number: $C_{10+}$ | vol. % | 2.5 | 2.5 | 0.0 | 4.9 | 2.0 | 31.7 | 0.0 |
| composition | saturates | vol. % | 92.8 | 94.4 | 98.9 | 91.7 | 4.5 | 0.4 | 95.5 |
| | olefins | vol. % | 0.6 | 0.8 | 0.0 | 0.0 | 0.1 | 0.0 | 4.4 |
| | aromatics | vol. % | 6.6 | 4.8 | 1.1 | 8.3 | 95.4 | 99.6 | 0.1 |
| | paraffins in saturates | vol. % | 85.5 | 87.3 | 92.6 | 79.0 | 98.4 | 97.4 | 98.2 |
| | branched paraffins in paraffins | vol. % | 44.4 | 45.0 | 37.2 | 48.6 | 48.4 | 86.8 | 72.5 |

TABLE 1-continued

|  |  |  | desulfurized full-range naphtha*1 | desulfurized full-range naphtha B*2 | desulfurized light naphtha*3 | desulfurized heavy naphtha*4 | middle to heavy distillate of reformate*5 | heavy distillate of reformate*6 | sulfolane raffinate*7 |
|---|---|---|---|---|---|---|---|---|---|
| oxygen |  | mass % | 0.0 | 0.0 | 0.0 | 0.0 | 0.0 | 0.0 | 0.0 |
| distillation | initial boiling point | °C. | 35.0 | 42.0 | 28.0 | 71.5 | 102.5 | 162.5 | 66.0 |
|  | 10% point | °C. | 55.0 | 59.5 | 40.5 | 92.5 | 117.5 | 164.0 | 72.5 |
|  | 30% point | °C. | 73.5 | 75.5 | 47.5 | 100.5 | 123.0 | 165.5 | 75.5 |
|  | 50% point | °C. | 91.5 | 92.0 | 51.5 | 111.5 | 129.5 | 167.5 | 79.5 |
|  | 70% point | °C. | 112.5 | 111.5 | 57.5 | 127.0 | 137.5 | 171.0 | 86.0 |
|  | 90% point | °C. | 134.5 | 135.0 | 68.5 | 135.5 | 151.0 | 190.5 | 98.5 |
|  | final boiling point | °C. | 155.5 | 152.5 | 78.5 | 157.5 | 191.5 | 270.0 | 126.0 |
| heat capacity (liquid) |  | kJ/kg·°C. | 2.105 | 2.113 | 2.197 | 2.038 | 1.715 | 1.699 | 2.155 |
| heat capacity (gas) |  | kJ/kg·°C. | 1.523 | 1.536 | 1.569 | 1.506 | 1.172 | 1.238 | 1.573 |
| heat of vaporization |  | kJ/kg | 317.2 | 324.7 | 344.4 | 304.2 | 344.4 | 309.6 | 318.8 |
| RVP |  | kPa | 66.9 | 58.6 | 95.6 | 19.5 | 7.0 | 0.1 | 29.9 |
| research octane number |  |  | 63.4 | 60.1 | 71.8 | 53.2 | 111.5 | 118.0 | 56.9 |
| oxidation stability |  | min. | >1440 | >1440 | >1440 | >1440 | >1440 | >1440 | >1440 |
| density |  | g/cm³ | 0.7085 | 0.7112 | 0.6564 | 0.7331 | 0.8621 | 0.8883 | 0.6821 |
| net heat of combustion |  | kJ/kg | 44225 | 44267 | 44819 | 43940 | 41024 | 41250 | 44585 |

*1: those obtained by desulfurization of naphtha fractions obtained by distillation of crude oil
*2: those obtained by desulfurization of naphtha fractions obtained by distillation of crude oil
*3: light components obtained by further distilling desulfurized full-range naphtha
*4: heavy components obtained by further distilling desulfurized full-range naphtha
*5: middle to heavy components obtained by further distilling reformate
*6: heavy components obtained by further distilling reformate
*7: remaining fractions left after extracting aromatics from reformate with a sulfolane process

TABLE 2

|  |  |  | alkylate*8 | low sulfur alkylate*9 | desulfurized alkylate*10 | isomerate*11 | GTL naphtha*12 | LPG |
|---|---|---|---|---|---|---|---|---|
| sulfur |  |  | 8 | 0.1 | 0.5 | 0.3 | 0.1 | 2 |
| hydrocarbon ratio | carbon number: $C_4$ | vol. % | 8.6 | 8.4 | 8.5 | 2.4 | 2.1 | 97.9 |
|  | carbon number: $C_5$ | vol. % | 3.2 | 3.3 | 3.3 | 43.6 | 12.4 | 0.2 |
|  | carbon number: $C_6$ | vol. % | 2.8 | 2.9 | 2.9 | 53.6 | 19.7 | 0.0 |
|  | carbon number: $C_7$ | vol. % | 2.5 | 2.4 | 2.5 | 0.3 | 21.0 | 0.0 |
|  | carbon number: $C_8$ | vol. % | 79.8 | 80.2 | 79.9 | 0.1 | 23.6 | 0.0 |
|  | carbon number: $C_7 + C_8$ | vol. % | 82.3 | 82.6 | 82.4 | 0.4 | 44.6 | 0.0 |
|  | carbon number: $C_9$ | vol. % | 1.1 | 0.9 | 0.9 | 0.0 | 17.7 | 0.0 |
|  | carbon number: $C_{10+}$ | vol. % | 2.0 | 1.9 | 1.9 | 0.0 | 3.5 | 0.0 |
| composition | saturates | vol. % | 99.8 | 99.7 | 99.8 | 99.9 | 100.0 | 99.4 |
|  | olefins | vol. % | 0.1 | 0.2 | 0.1 | 0.1 | 0.0 | 0.6 |
|  | aromatics | vol. % | 0.1 | 0.1 | 0.1 | 0.0 | 0.0 | 0.0 |
|  | paraffins in saturates | vol. % | 100.0 | 100.0 | 100.0 | 98.4 | 100.0 | 100.0 |
|  | branched paraffins in paraffins | vol. % | 91.3 | 91.4 | 91.4 | 83.5 | 53.5 | 34.6 |
| oxygen |  | mass % | 0.0 | 0.0 | 0.0 | 0.0 | 0.0 | 0.0 |
| distillation | initial boiling point | °C. | 31.0 | 30.5 | 30.0 | 32.0 | 31.5 | — |
|  | 10% point | °C. | 71.5 | 71.0 | 71.0 | 40.5 | 47.5 | — |
|  | 30% point | °C. | 98.5 | 99.0 | 98.5 | 43.5 | 69.5 | — |
|  | 50% point | °C. | 105.5 | 105.0 | 106.0 | 46.5 | 92.5 | — |
|  | 70% point | °C. | 110.0 | 110.5 | 111.0 | 51.0 | 113.5 | — |
|  | 90% point | °C. | 122.5 | 121.5 | 122.0 | 58.5 | 129.5 | — |
|  | final boiling point | °C. | 181.5 | 177.0 | 180.0 | 70.0 | 150.5 | — |
| heat capacity (liquid) |  | kJ/kg·°C. | 2.071 | 2.071 | 2.075 | 2.197 | 2.167 | 2.368 |
| heat capacity (gas) |  | kJ/kg·°C. | 1.590 | 1.594 | 1.590 | 1.582 | 1.590 | 1.628 |
| heat of vaporization |  | kJ/kg | 289.8 | 290.8 | 290.2 | 332.8 | 309.5 | 379.5 |
| RVP |  | kPa | 58.5 | 59.5 | 59.0 | 91.0 | 72.3 | 338.0 |
| research octane number |  |  | 95.6 | 95.4 | 95.4 | 81.8 | 51.5 | 95.0 |
| oxidation stability |  | min. | >1440 | >1440 | >1440 | >1440 | >1440 | — |

TABLE 2-continued

|  |  | alkylate*8 | low sulfur alkylate*9 | desulfurized alkylate*10 | isomerate*11 | GTL naphtha*12 | LPG |
|---|---|---|---|---|---|---|---|
| density | g/cm³ | 0.6955 | 0.6951 | 0.6954 | 0.6475 | 0.6825 | 0.5778 |
| net heat of combustion | kJ/kg | 44488 | 44501 | 44480 | 44798 | 44576 | 45681 |

*8: gasoline fractions obtained by treating butane, butene fractions with an alkylation process
*9: gasoline fractions obtained by treating desulfurized butane, butene fractions with an alkylation process
*10: substances obtained by desulfurizing gasoline fractions obtained by treating butane, butene fractions with an alkylation process
*11: gasoline fractions obtained by treating desulfurized light naphtha with an isomerization process
*12: "Gas to Liquid" naphtha fractions which are obtained by cracking natural gas or the like to CO and $H_2$ and then subjecting to synthesis, decomposition, and isomerization

TABLE 3

| | | | Ex. 1 | Ex. 2 | Ex. 3 | Ex. 4 | Ex. 5 | Comp. Ex. 3 | Ex. 7 |
|---|---|---|---|---|---|---|---|---|---|
| Mixing ratio | LPG | | | | | | | | |
| | desulfurized light naphtha | | | | | 100% | | | |
| | desulfurized heavy naphtha | | | | | | 100% | | |
| | desulfurized full-range naphtha | | 100% | | | | | | |
| | desulfurized full-range naphtha B | | | | | | | | |
| | GTL naphtha | | | | 100% | | | | |
| | isomerate | | | | | | 100% | | |
| | alkylate | | | | | | | | 100% |
| | low sulfur alkylate | | | | | | | | |
| | desulfurized alkylate | | | | | | | | |
| | sulfolane raffinate | | | | | | | | 100% |
| | middle to heavy distillate of reformate | | | | | | | | |
| | heavy distillate of reformate | | | | | | | | |
| Properties | Sulfur | ppm by mass | 0.3 | 0.1 | 0.1 | 0.3 | 0.2 | 8.0 | 0.4 |
| | Composition | | | | | | | | |
| | saturates | vol. % | 92.8 | 100.0 | 98.9 | 99.9 | 91.7 | 99.8 | 95.5 |
| | olefins | vol. % | 0.0 | 0.0 | 0.0 | 0.1 | 0.0 | 0.1 | 4.4 |
| | aromatics | vol. % | 6.6 | 0.0 | 1.1 | 0.0 | 8.3 | 0.1 | 0.1 |
| | paraffins in saturates | vol. % | 85.5 | 100.0 | 92.6 | 98.4 | 79.0 | 100.0 | 98.2 |
| | branched paraffins in paraffins | vol. % | 44.4 | 53.5 | 37.2 | 83.5 | 48.6 | 91.3 | 72.5 |
| | Density | g/cm³ | 0.7085 | 0.6825 | 0.6564 | 0.6475 | 0.7331 | 0.6955 | 0.6821 |
| | Reid vapor pressure | kPa | 67 | 72 | 89 | 91 | 19 | 55 | 31 |
| | Net heat of combustion | kJ/kg | 44230 | 44580 | 44820 | 44798 | 43940 | 44490 | 44590 |
| | Heat capacity (liquid) | kJ/kg · °C. | 2.105 | 2.167 | 2.197 | 2.197 | 2.038 | 2.071 | 2.155 |
| | Heat capacity (gas) | kJ/kg · °C. | 1.523 | 1.590 | 1.569 | 1.582 | 1.506 | 1.590 | 1.573 |
| | Heat of vaporization | kJ/kg | 317.2 | 309.5 | 344.4 | 332.8 | 304.2 | 289.8 | 318.8 |

| | | | Ex. 8 | Ex. 9 | Ex. 10 | Comp. Ex. 1 | Comp. Ex. 2 |
|---|---|---|---|---|---|---|---|
| Mixing ratio | LPG | | | | | | 17% |
| | desulfurized light naphtha | | | | | | |
| | desulfurized heavy naphtha | | | | | | |
| | desulfurized full-range naphtha | | | | | | |
| | desulfurized full-range naphtha B | | | | 100% | | |
| | GTL naphtha | | | | | | |
| | isomerate | | | | | | |
| | alkylate | | | | | | |
| | low sulfur alkylate | | 100% | | | | |
| | desulfurized alkylate | | | 100% | | | |
| | sulfolane raffinate | | | | | | |
| | middle to heavy distillate of reformate | | | | | 30% | 15% |
| | heavy distillate of reformate | | | | | 70% | 68% |
| Properties | Sulfur | ppm by mass | 0.1 | 0.5 | 0.3 | 0.3 | 0.5 |
| | Composition | | | | | | |
| | saturates | vol. % | 99.7 | 99.8 | 94.4 | 1.6 | 17.9 |
| | olefins | vol. % | 0.2 | 0.1 | 0.8 | 0.0 | 0.1 |
| | aromatics | vol. % | 0.1 | 0.1 | 4.8 | 98.3 | 82.0 |
| | paraffins in saturates | vol. % | 100.0 | 100.0 | 87.3 | 98.2 | 99.9 |
| | branched paraffins in paraffins | vol. % | 91.4 | 91.4 | 45.0 | 54.8 | 35.9 |
| | Density | g/cm³ | 0.6951 | 0.6954 | 0.7112 | 0.8804 | 0.8316 |
| | Reid vapor pressure | kPa | 60 | 59 | 59 | 7 | 102 |
| | Net heat of combustion | kJ/kg | 44500 | 44480 | 44267 | 41180 | 41738 |
| | Heat capacity (liquid) | kJ/kg · °C. | 2.071 | 2.075 | 2.113 | 1.704 | 1.780 |

TABLE 3-continued

| | | | | | | | |
|---|---|---|---|---|---|---|---|
| Heat capacity (gas) | kJ/kg · ° C. | 1.594 | 1.590 | 1.536 | 1.219 | 1.274 |
| Heat of vaporization | kJ/kg | 290.8 | 290.2 | 324.7 | 319.8 | 323.3 |

These respective fuels were subjected to a fuel cell system evaluation test, an evaporative gas test, and a storage stability test.

Fuel Cell System Evaluation Test (1) Steam Reforming

A fuel and water were evaporated by electric heating and led to a reformer filled with a noble metal type catalyst and kept at a prescribed temperature by an electric heater to generate a reformed gas enriched with hydrogen.

The temperature of the reformer was adjusted to be the minimum temperature (the minimum temperature at which no THC was contained in a reformed gas) at which reforming was completely carried out in an initial stage of the test.

Together with steam, a reformed gas was led to a carbon monoxide conversion apparatus (a water gas shift reaction) to convert carbon monoxide in the reformed gas to carbon dioxide and then the produced gas was led to a solid polymer type fuel cell to carry out power generation.

A flow chart of a steam reforming type fuel cell system employed for the evaluation was illustrated in FIG. 1.

(2) Partial Oxidation

A fuel is evaporated by electric heating and together with air, the evaporated fuel was led to a reformer filled with a noble metal type catalyst and kept at a 1100° C. by an electric heater to generate a reformed gas enriched with hydrogen.

Together with steam, a reformed gas was led to a carbon monoxide conversion apparatus (a water gas shift reaction) to convert carbon monoxide in the reformed gas to carbon dioxide and then the produced gas was led to a solid polymer type fuel cell to carry out power generation.

Figure 2:
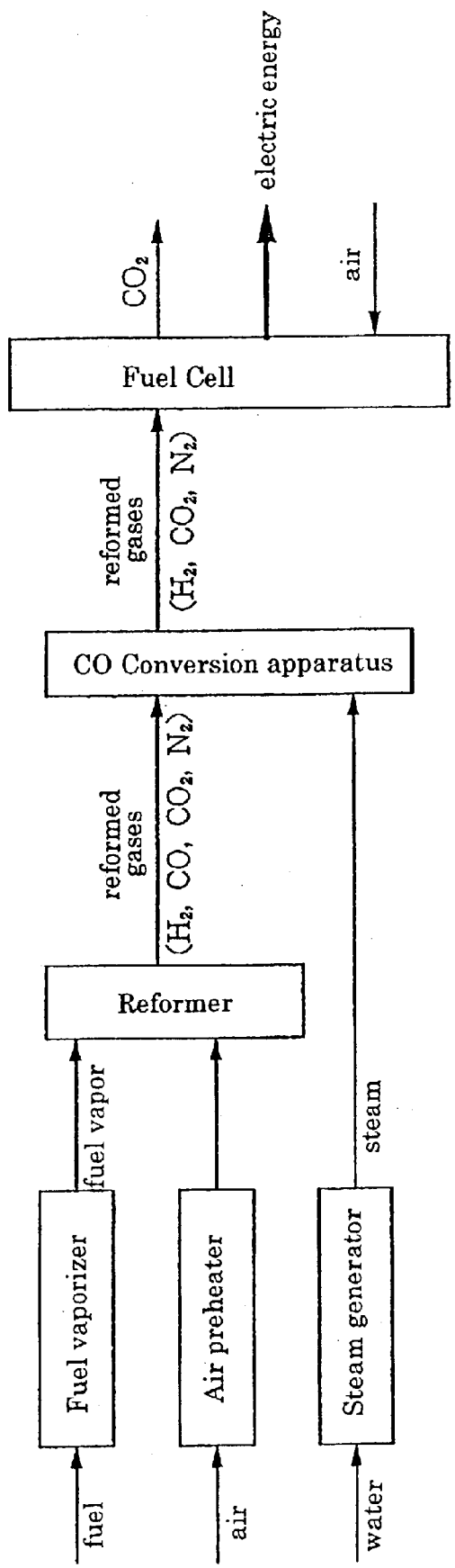
FIG. 2 is a flow chart of a partial oxidation type fuel cell system employed for evaluation of a fuel for a fuel cell system of the invention.

A flow chart of a partial oxidation type fuel cell system employed for the evaluation was illustrated in FIG. 2.

(3) Evaluation Method

The amounts of $H_2$, CO, $CO_2$ and THC in the reformed gas generated from a reformer were measured immediately after starting of the evaluation test. Similarly, the amounts of $H_2$, CO, $CO_2$ and THC in the reformed gas generated from a carbon monoxide conversion apparatus were measured immediately after starting of the evaluation test.

The power generation quantity, the fuel consumption, and the $CO_2$ amount emitted out of a fuel cell were measured immediately after starting of the evaluation test and 100 hours later from the starting.

The energy (preheating energy) necessary to heat the respective fuels to a prescribed reforming temperature were calculated from the heat capacities and the heat of vaporization.

Further, these measured values, calculated values and the net heat of combustion of respective fuels were employed for calculation of the performance deterioration ratio of a reforming catalyst (the power generation amount after 100 hours later from the starting divided by the power generation amount immediately after the starting), the thermal efficiency (the power generation amount immediately after the starting divided by the net heat of combustion of a fuel), and the preheating energy ratio (preheating energy divided by the power generation amount).

Evaporative Gas Test

A hose for filling a sample was attached to a fuel supply port of a 20 liter portable gasoline can and the installation part was completely sealed. While an air venting valve of the can being opened, 5 liter of each fuel was loaded. On completion of the loading, the air venting valve was closed and the can was left still for 30 minutes. After the can being kept still, an activated carbon adsorption apparatus was attached to the air venting valve and the valve was opened. Immediately, 10 liter of each fuel was supplied from the fuel supply port. After 5 minutes of the fuel supply, while the air venting valve being opened and kept as it was, the vapor was absorbed in the activated carbon and after that, the weight increase of the activated carbon was measured. Incidentally, the test was carried out at a constant temperature of 25° C.

Storage Stability Test

A pressure resistant closed container was filled with each fuel and oxygen, heated to 100° C. and while the temperature being kept as it was, the container was kept still for 24 hours. Evaluation was carried out according to "Petroleum products-Motor gasoline and aviation fuels-Determination of washed existent gum" defined as JIS K 2261.

The respective measured values and the calculated values are shown in Table 4.

TABLE 4

| | | | Ex. 1 | Ex. 2 | Ex. 3 | Ex. 4 | Ex. 5 |
|---|---|---|---|---|---|---|---|
| Evaluation results | | | | | | | |
| Electric power generation by steam reforming method (reforming temperature = optimum reforming temperature 1)) | | | | | | | |
| Optimum reforming temperature | ° C. | | 670 | 670 | 680 | 660 | 670 |
| Electric energy | kJ/fuel kg | initial performance | 29850 | 30150 | 30260 | 30330 | 29670 |
| | | 100 hours later | 29820 | 30130 | 30240 | 30260 | 29650 |

TABLE 4-continued

| | | | | | | | |
|---|---|---|---|---|---|---|---|
| | performance deterioration ratio | 100 hours later | 0.10% | 0.07% | 0.07% | 0.23% | 0.07% |
| Thermal efficiency 2) | | initial performance | 68% | 68% | 68% | 68% | 68% |
| $CO_2$ generation | kg/fuel kg | initial performance | 3.098 | 3.074 | 3.064 | 3.059 | 3.113 |
| Energy per $CO_2$ | $KJ/CO_2$-kg | initial performance | 9634 | 9808 | 9876 | 9916 | 9531 |
| Preheating energy 3) | kJ/fuel kg | | 1341 | 1376 | 1391 | 1349 | 1321 |
| Preheating energy ratio 4) | | | 4.5% | 4.6% | 4.6% | 4.4% | 4.5% |
| Electric power generation by partial oxidation reforming method (reforming temperature 1100° C.) | | | | | | | |
| Electric energy | kJ/fuel kg | initial performance | 14380 | 14810 | 14970 | 15070 | 14130 |
| | | 100 hours later | 14370 | 14800 | 14960 | 15040 | 14110 |
| | performance deterioration ratio | 100 hours later | 0.07% | 0.07% | 0.13% | 0.20% | 0.14% |
| Thermal efficiency 2) | | initial performance | 33% | 33% | 33% | 34% | 32% |
| $CO_2$ generation | kg/fuel kg | initial performance | 3.101 | 3.075 | 3.065 | 3.057 | 3.115 |
| Energy per $CO_2$ | $KJ/CO_2$-kg | initial performance | 4637 | 4816 | 4884 | 4930 | 4536 |
| Preheating energy 3) | kJ/fuel kg | | 1988 | 2056 | 2047 | 2045 | 1969 |
| Preheating energy ratio 4) | | | 13.8% | 13.9% | 13.7% | 13.6% | 13.9% |
| Evaporative gas test | | | | | | | |
| Evaporative gas Storage stability test | g/test | | 7.5 | 7.8 | 21.5 | 13.7 | 4.1 |
| Washed existent gum | mg/100 ml | | 1 | 1 | 2 | 2 | 2 |

| | | | Comp. Ex. 3 | Ex. 7 | Ex. 8 | Ex. 9 | Ex. 10 |
|---|---|---|---|---|---|---|---|
| Evaluation results | | | | | | | |
| Electric power generation by steam reforming method (reforming temperature = optimum reforming temperature 1)) | | | | | | | |
| Optimum reforming temperature | ° C. | | 655 | 660 | 655 | 655 | 670 |
| Electric energy | kJ/fuel kg | initial performance | 30100 | 30160 | 30120 | 30120 | 29840 |
| | | 100 hours later | 29990 | 30110 | 30100 | 30080 | 29820 |
| | performance deterioration ratio | 100 hours later | 0.37% | 0.17% | 0.07% | 0.13% | 0.07% |
| Thermal efficiency 2) | | initial performance | 68% | 68% | 68% | 68% | 68% |
| $CO_2$ generation | kg/fuel kg | initial performance | 3.078 | 3.073 | 3.076 | 3.077 | 3.099 |
| Energy per $CO_2$ | $KJ/CO_2$-kg | initial performance | 9779 | 9815 | 9792 | 9789 | 9631 |
| Preheating energy 3) | kJ/fuel kg | | 1330 | 1353 | 1332 | 1334 | 1359 |
| Preheating energy ratio 4) | | | 4.4% | 4.5% | 4.4% | 4.4% | 4.6% |
| Electric power generation by partial oxidation reforming method (reforming temperature 1100° C.) | | | | | | | |
| Electric energy | kJ/fuel kg | initial performance | 14740 | 14820 | 14760 | 14770 | 14380 |
| | | 100 hours later | 14700 | 14790 | 14750 | 14750 | 14370 |
| | performance deterioration ratio | 100 hours later | 0.27% | 0.20% | 0.07% | 0.14% | 0.07% |

TABLE 4-continued

| | | | | | | | | |
|---|---|---|---|---|---|---|---|---|
| Thermal efficiency 2) | | initial performance | 33% | 33% | 33% | 33% | 33% | |
| $CO_2$ generation | kg/fuel kg | initial performance | 3.080 | 3.075 | 3.077 | 3.076 | 3.100 | |
| Energy per $CO_2$ | $KJ/CO_2$-kg | initial performance | 4786 | 4820 | 4797 | 4802 | 4639 | |
| Preheating energy 3) | kJ/fuel kg | | 2037 | 2042 | 2042 | 2038 | 1986 | |
| Preheating energy ratio 4) | | | 13.8% | 13.8% | 13.8% | 13.8% | 13.8% | |
| Evaporative gas test | | | | | | | | |
| Evaporative gas Storage stability test | g/test | | 7.9 | 6.1 | 8.0 | 7.9 | 4.5 | |
| Washed existent gum | mg/100 ml | | 1 | 2 | 1 | 1 | 1 | |

| | | | | Comp. Ex. 1 | Comp. Ex. 2 |
|---|---|---|---|---|---|
| Evaluation results | | | | | |
| Electric power generation by steam reforming method (reforming temperature = optimum reforming temperature 1)) | | | | | |
| Optimum reforming temperature | ° C. | | | 720 | 700 |
| Electric energy | kJ/fuel kg | | initial performance | 26290 | 26680 |
| | | | 100 hours later | 24910 | 24990 |
| | | performance deterioration ratio | 100 hours later | 5.25% | 6.33% |
| Thermal efficiency 2) | | | initial performance | 64% | 64% |
| $CO_2$ generation | kg/fuel kg | | initial performance | 3.294 | 3.260 |
| Energy per $CO_2$ | $KJ/CO_2$-kg | | initial performance | 7981 | 8184 |
| Preheating energy 3) | kJ/fuel kg | | | 1174 | 1237 |
| Preheating energy ratio 4) | | | | 4.5% | 4.6% |
| Electric power generation by partial oxidation reforming method (reforming temperature 1100° C.) | | | | | |
| Electric energy | kJ/fuel kg | | initial performance | 10540 | 11090 |
| | | | 100 hours later | 10010 | 10520 |
| | | performance deterioration ratio | 100 hours later | 5.03% | 5.14% |
| Thermal efficiency 2) | | | initial performance | 26% | 27% |
| $CO_2$ generation | kg/fuel kg | | initial performance | 3.199 | 3.261 |
| Energy per $CO_2$ | $KJ/CO_2$-kg | | initial performance | 3295 | 3401 |
| Preheating energy 3) | kJ/fuel kg | | | 1637 | 1748 |
| Preheating energy ratio 4) | | | | 15.5% | 15.8% |
| Evaporative gas test | | | | | |
| Evaporative gas Storage stability test | g/test | | | 1.9 | 43.9 |
| Washed existent gum | mg/100 ml | | | 2 | 1 |

1) the minimum temperature at which no THC is contained in a reformed gas
2) electric energy/net heat of combustion of fuel
3) energy necessary for heating a fuel to a reforming temperature
4) preheating energy/electric energy

INDUSTRIAL APPLICABILITY

As described above, a fuel for a fuel cell system of the invention has performances with small deterioration and can provide high output of electric energy, and further the fuel can satisfy a variety of performances for a fuel cell system.

What is claimed is:

1. A fuel for a fuel cell system comprising hydrocarbon compounds, wherein a content of saturates is 30 vol. % or more, a content of olefins is 35 vol. % or less and a content of aromatics is 50 vol. % or less, a sulfur content is 1 ppm by mass or less, a ratio of branched paraffins in paraffins is 30 vol. % or more, and wherein Reid vapor pressure of the fuel is 10 kPa or more and less than 100 kPa.

* * * * *